United States Patent [19]

Herzog et al.

[11] 4,340,627
[45] Jul. 20, 1982

[54] WOUND AND SINTERED VITREOUS SILICA ARTICLE AND METHOD OF MAKING

[75] Inventors: Heinz Herzog, Karlstein; Heinrich Mohn, Gelnhausen; Karl-Albert Schulke, Neuberg; Holger Grzybowski, Bruchköbel, all of Fed. Rep. of Germany

[73] Assignee: Heraeus Quarzschmelze GmbH, Hanau am Main, Fed. Rep. of Germany

[21] Appl. No.: 182,155

[22] Filed: Aug. 28, 1980

[30] Foreign Application Priority Data

Aug. 31, 1979 [DE] Fed. Rep. of Germany ....... 2935198

[51] Int. Cl.³ .................... C03B 23/00; B32B 17/02
[52] U.S. Cl. .................................. 428/36; 65/4.1; 65/4.3; 156/82; 156/89; 156/169; 156/173; 156/175; 156/308.2; 264/56; 264/80; 264/285; 264/332; 428/105; 428/113; 428/219; 428/220; 428/296; 428/391; 428/392; 428/426
[58] Field of Search ............... 156/89, 169, 82, 173, 156/175, 308.2; 428/36, 371, 296, 105, 113, 219, 220, 392, 426; 65/4.1, 4.3; 264/56, 80, 285, 332, 1

[56] References Cited

U.S. PATENT DOCUMENTS

| 3,174,388 | 3/1965 | Gaubatz | 156/169 |
| 3,184,092 | 5/1965 | George | 156/169 |
| 3,632,460 | 1/1972 | Palfreyman | 156/169 |
| 3,645,833 | 2/1972 | Figge | 156/169 |
| 3,673,049 | 6/1972 | Giffen | 264/60 |
| 3,707,415 | 12/1972 | Golladay et al. | 156/169 |
| 3,730,795 | 5/1973 | Medney et al. | 156/169 |
| 3,794,540 | 2/1974 | Griffith | 156/169 |
| 4,097,293 | 6/1978 | Kometa et al. | 264/60 |

Primary Examiner—Willard E. Hoag
Attorney, Agent, or Firm—Sprung, Horn, Kramer & Woods

[57] ABSTRACT

A method is described for the production of porous bodies from vitreous silica without the use of tools. Vitreous silica wool and/or threads are wound in layers on a form. After the coil has attained a certain minimum thickness, the threads of each succeeding layer are permanently bonded by heating the threads of the preceding layer at the points where the threads cross. The form is removed, and then the threads on the inside of the body are bonded together.

The bodies are used for the production of high-purity blocks of silicon for solar cells.

14 Claims, 2 Drawing Figures

WOUND AND SINTERED VITREOUS SILICA ARTICLE AND METHOD OF MAKING

BACKGROUND OF THE INVENTION

1. Field of the Invention

The invention relates to a method for the tool-free production of bodies, especially hollow bodies, from vitreous silica, in which vitreous silica threads and/or vitreous silica wool are bonded permanently together. It furthermore concerns the use of the bodies made by the method.

2. Discussion of Prior Art

It is known from German Pat. No. 682,606 to produce objects of vitreous silica by pressing vitreous silica wool into molds and melting it. It is furthermore known to produce comparatively large boards from vitreous silica wool. For this purpose the vitreous silica wool is carried by means of a conveyor belt and a roller through a large chamber in which the individual glass threads are welded together. Bodies of vitreous silica have also been made by uniting vitreous silica threads under heat and pressure. Furthermore, it is known to produce thin, flexible bands and sheets of any desired width from fused vitreous silica by shaping a felt-like mass of threads or staple fibers into a thin band or a thin sheet, and then weld together the individual fibers of the band or sheet under pressure and appropriate heat.

German Pat. No. 1,127,040 teaches the production of opaque bodies from parallelly arranged mineral threads. The threads drawn from dies are welded side by side immediately after emerging from the dies, at a temperature of 500° to 800° C., and under pressure, and then immediately cooled.

The production without tools of articles of glass or minieral fibers is known from German Auslegeschrift No. 1,200,725. In this case, first a mat is formed from a fiber mixture, and is then heated rapidly from the ambient temperature to about 600° C., the mat being then subjected to a slight air pressure without the use of mechanical pressing or shaping elements.

THE INVENTION

It is the object of the invention to develop a method for the production without tools of porous bodies of vitreous silica, which permits the production of any desired bodies without the danger of the contamination of the bodies in any way during their production.

This object is attained for the method described above, in accordance with the invention, by winding the threads and/or wool in crossing courses onto a form or mandrel; then, after a sufficient minimum winding depth has been reached, sintering or fusing each succeeding layer to the preceding layer at the crossings of the threads and/or wool by means of a flame or equivalent external heat source, and, after the coil has reached a given winding depth, removing the coil from the form and, by means of the flame or equivalent heat source, sintering or fusing together the threads and/or wool of the first, minimum-thickness layer from the surface that was in contact with the form.

The minimum total depth of the initial layers of threads and/or wool to be wound on the form must be great enough to assure a sufficient thermal initial layers of threads and/or wool to be wound on the form must be great enough to assure a sufficient thermal insulation of the form and thereby prevent any possible reaction between the form and the threads and/or wool wound onto it, when the succeeding layers are bonded together by means of the flame or equivalent external heat source. In practice, minimum initial winding depths ranging from 1 to 5 mm have proven practical.

To increase the mechanical stability of the finished porous body, it has been found desirable to modify the diameter of the threads and/or wool from layer to layer, and especially to increase it as the thickness of the coil increases.

To lend greater stability to the bodies in particular areas, it is also possible by the method of the invention to wind the threads and/or wool to a greater depth in one given area than in an adjacent area. In this manner, porous hollow bodies having strenthened bottoms or rims, for example, can be made.

Before they are wound onto the form, the vitreous silica threads are advantageously drawn from a vitreous silica rod produced without tools, and it has been found desirable to use a vitreous silica wool in which the individual wool filaments have a diameter ranging from 5 to 30 micrometers. In the case of vitreous silica threads, a diameter ranging from 30 to 200 micrometers has been found desirable.

The porous bodies made in accordance with the invention have the advantage that no harmful interaction can take place between the vitreous silica and any kind of tools throughout the entire manufacturing process, so that the bodies have an extraordinarily high purity depending solely on the purity of the vitreous silica used. On account of this high purity, the bodies made in accordance with the invention are used advantageously as liners of molds for the production of high-purity blocks of semiconductor material, such as silicon, especially for solar cells.

BRIEF DESCRIPTION OF DRAWING

An example of the method of the invention will now be described in conjunction with the drawings in which.

DESCRIPTION OF SPECIFIC EMBODIMENT

Figure 2:
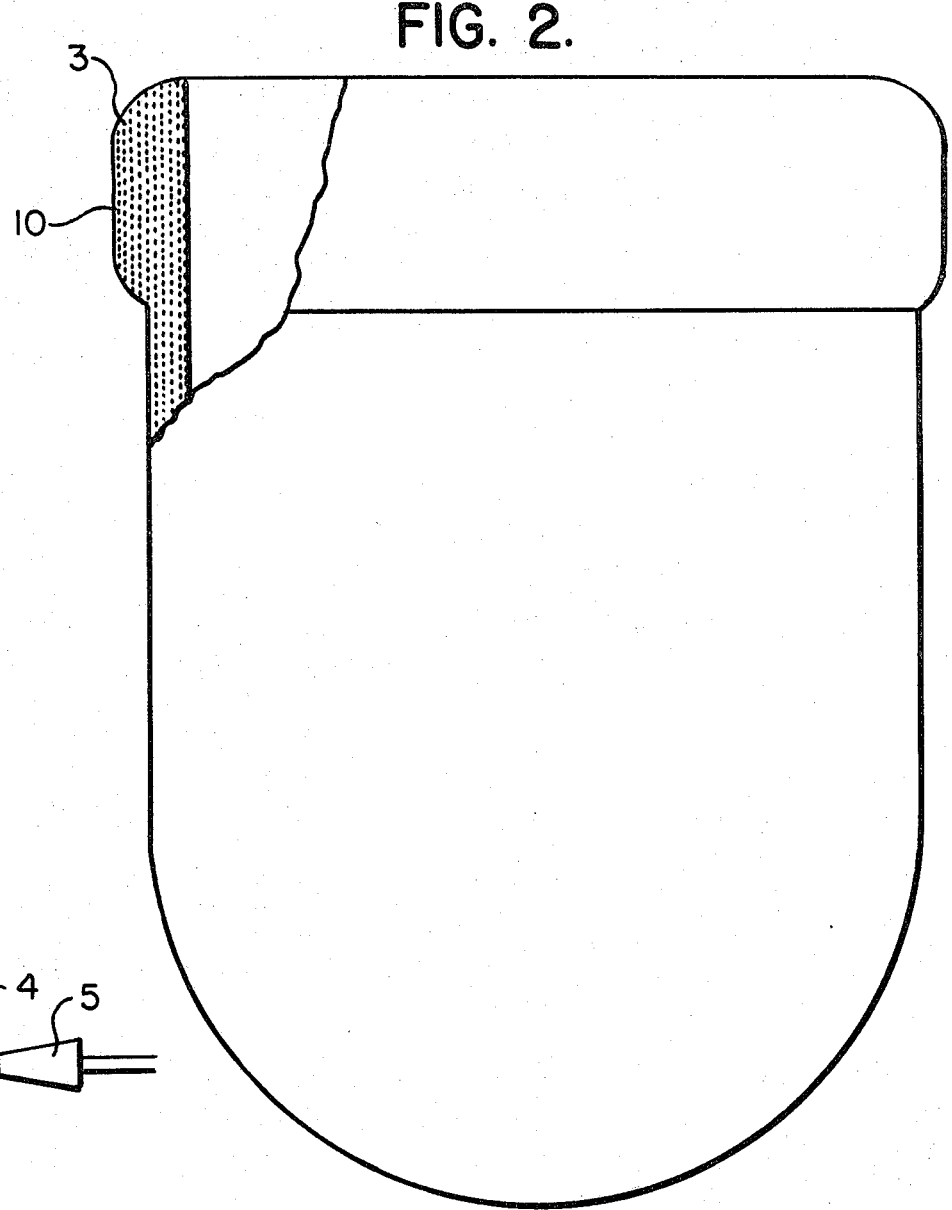
FIG. 2 represents a porous body, partially in longitudinal cross section.
Figure 1:
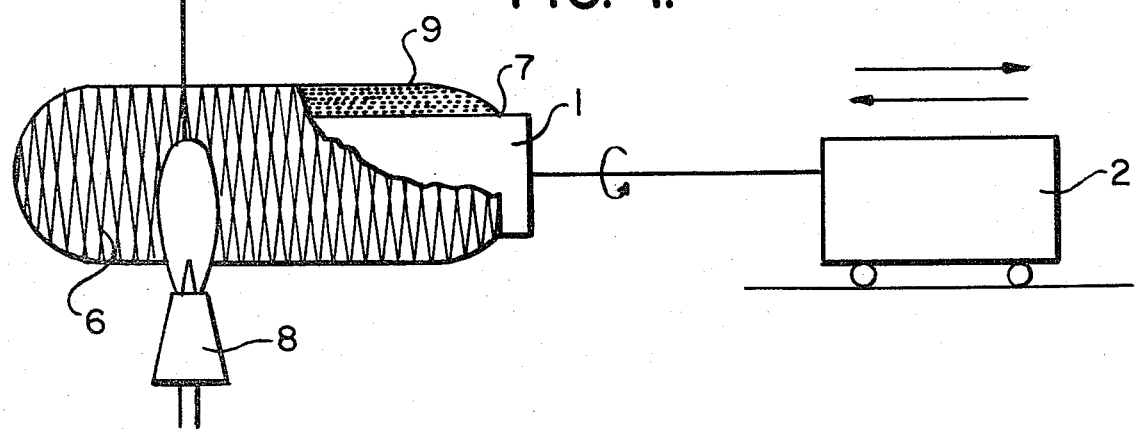
FIG. 1 is a diagrammatic representation of the embodiment of a method in accordance with the invention.

A vitreous silica thread 3 is wound onto a form 1 which is held by a turning device 2 which can travel in the direction of the axis of the form. The vitreous silica thread is produced by drawing from a vitreous silica rod 3 which is heated at the drawing end by a burner 5. The combined translatory and rotatory movement of the form produces a cross-laying of the individual layers of vitreous silica threads.

After a layer 7 of a certain minimum depth has been laid on, the burner 8 is ignited, by means of which each succeeding layer of thread is then fused to the preceding layer at the points where the threads cross over one another. The layer 7 protects the form against the heat of the burner 8. The numerous thread layers 9 fused onto the minimum-thickness layer 7 form a self-supporting bond. As soon as the thread layers 9 have reached a desired total depth, the winding operation is terminated, the entire coil is removed from the form, and the layer 7 is fused with a separate burner.

FIG. 2 shows on a larger scale a body made in accordance with the invention. In this body the threads 3 were wound onto the form in uniformly thick layers.

The rim area 10 has a greater thickness than the portion of the body immediately adjacent thereto.

The weight per unit of area of the porous body made in accordance with the invention ranges from 100 to 270 grams per square meter, amounting preferably to 150 to 250 g/m$^2$.

What is claimed is:

1. In a method for the manufacture, of porous bodies, especially hollow bodies, from transparent vitreous silica, in which viteous silica threads and/or vitreous silica wool are bonded together, the improvement including winding the threads and/or wool in crossing courses onto a mandrel to form a coil and, after a sufficient minimum thickness of the winding has been reached, sintering or fusing each succeeding layer during its winding to the the preceding layer; at the attainment of a given thickness of the coil, removing the coil removed from the mandrel and then the threads and/or wool of the minimum layer are sintered or fused together from the surface which lay in contact with the mandrel.

2. Method of claim 1, wherein the threads and/or the wool are wound on the mandrel in uniformly thick layers.

3. Method of claim 1, wherein at least at a given area the filaments and/or the wool are wound in greater thickness than in the adjacent area.

4. Method of claim 1, wherein the vitreous silica is sintered by use of a flame.

5. Method of claim 1, wherein the vitreous silica threads or the vitreous silica wool are drawn, prior to their being wound on the mandrel, to form a vitreous silica rod.

6. Method of claim 5, wherein vitreous silica wool is drawn to a thickness of the individual wool filaments in the range from 5 to 30 micrometers.

7. Method of claim 5, wherein vitreous silica threads are drawn with a thread thickness in the range from 30 to 200 micrometers.

8. A mold lining for the casting or remelting of semiconductor material, especially silicon, made be the method of claim 1, said mold lining consisting essentially of vitreous silica threads sintered together in multiple crossed layers.

9. Mold lining of claim 8, wherein the weight per unit of area lies in the range of 100 to 270 g/m$^2$.

10. Mold lining of claim 8, wherein the same has a weight per unit area in the range 150–250 g/m$^2$.

11. Mold lining of claim 8, wherein the thickness of the vitreous silica threads lies in the range from 5 to 200 micrometers.

12. Mold lining of claim 11, wherein the thickness of the vitreous silica threads lies in the range from 5 to 30 micrometers.

13. Mold lining of one or more of claim 8, wherein a selected portion of the lining is thicker than in adjacent portion.

14. Mold lining of claim 13, wherein the rim portion is reinforced.

* * * * *